(12) United States Patent
Sase et al.

(10) Patent No.: US 8,654,551 B2
(45) Date of Patent: Feb. 18, 2014

(54) SUPPLY DEVICE, AND LED LIGHTING EQUIPMENT USING THE SAME

(75) Inventors: Takashi Sase, Hitachi (JP); Akihiko Kanouda, Hitachinaka (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 13/214,540

(22) Filed: Aug. 22, 2011

(65) Prior Publication Data
US 2012/0147494 A1 Jun. 14, 2012

(30) Foreign Application Priority Data
Dec. 10, 2010 (JP) ................. 2010-275764

(51) Int. Cl.
*H02M 7/08* (2006.01)
*H02J 1/10* (2006.01)
(52) U.S. Cl.
USPC ............................................ 363/70; 363/65
(58) Field of Classification Search
USPC ................. 363/59–62, 65, 67, 69–70, 74–85, 363/87–93
See application file for complete search history.

(56) References Cited

U.S. PATENT DOCUMENTS

| 2008/0191674 A1* | 8/2008 | Cheng et al. ................. 323/282 |
| 2009/0268496 A1* | 10/2009 | Tan et al. ....................... 363/126 |
| 2009/0303762 A1* | 12/2009 | Jang et al. ..................... 363/61 |
| 2010/0026208 A1* | 2/2010 | Shteynberg et al. .......... 315/297 |

FOREIGN PATENT DOCUMENTS

| JP | 05-022944 | 1/1993 |
| JP | 08-033227 | 2/1996 |
| JP | 2002-010632 | 1/2002 |
| JP | 2008-061489 | 3/2008 |
| JP | 2009-021535 | 1/2009 |
| JP | 2010-115088 | 5/2010 |

* cited by examiner

*Primary Examiner* — Jue Zhang
*Assistant Examiner* — Henry Lee, III
(74) *Attorney, Agent, or Firm* — Antonelli, Terry, Stout & Kraus, LLP.

(57) ABSTRACT

A power supply device includes two buck converters, having a coupling inductor Lo composed of two mutually-coupled inductors L1, L2, and a output capacitor Co, wherein of the two buck converters, a first buck converter is operated during a positive half-cycle period of an AC input voltage, and a second buck converter is operated during a negative half-cycle period of the AC input voltage, to obtain a DC output voltage at both ends of the output capacitor Co from the AC input voltage, is provided. Herewith, is provided the power-supply device using the buck converter, which can be reduced in the number of components and produced in a low cost without a diode bridge.

17 Claims, 9 Drawing Sheets

SUPPLY DEVICE, AND LED LIGHTING EQUIPMENT USING THE SAME

FIELD OF THE INVENTION

The present invention relates to a power-supply device of an AC-DC converter, and more particularly to the low cost power-supply device without a diode bridge.

BACKGROUND OF THE INVENTION

The conventionally-known power-supply device of the AC-DC converter generally comprises a PFC (power factor correction) converter composed of a rectifier using a diode bridge, and a boost converter.

In addition, US 2009-0303762A1 discloses a technology of the power-supply device using two buck converters, comprising the first buck converter and the second buck converter each composed of a diode, a switch, an inductor and an output capacitor, wherein the first buck converter is operated during a positive half-cycle period of an AC input voltage, and the second buck converter is operated during a negative half-cycle period of the AC input voltage, and obtaining a sum voltage of both ends voltage of each of the output capacitor as a DC output voltage.

SUMMARY OF THE INVENTION

However, the method using the diode bridge as the PFC converter requires a lot of elements which increases the production cost.

In addition, the power-supply device using the buck converter according to US 2009-0303762A1 forms a path coming back to the AC input voltage through a body diode incidental to the switch of the buck converter during the positive half-cycle period of the AC input voltage, therefore elements could be broken by an over-current. To prevent this element failure, two input diodes are required. Further, this method has a problem that two inductors, two sets of current senses which respectively control two buck converters, and two output capacitors are required as well, thereby the number of components doubled. Therefore, the number of components is not reduced adequately to reduce the cost.

The present invention has been invented to solve such a problem and an object of the present invention is to provide the power-supply device for the AC-DC converter using the buck converter, which is able to reduce the number of components and the production cost.

In order to solve the aforementioned problem and achieve the object, the present invention is characterized as follows.

That is to say, the present invention is characterized in comprising the AC-DC converter composed of the two buck converters having a coupling inductor composed of the two mutually-coupled inductors, and the output capacitor.

The present invention can provide the power-supply device for the AC-DC converter using the buck converter, wherein the power-supply device can be reduced in the number of components and produced in a low cost.

DETAILED DESCRIPTION OF THE INVENTION

Herein below, preferable embodiments of the present invention will be explained with reference to the drawings.

First Embodiment

Figure 1:
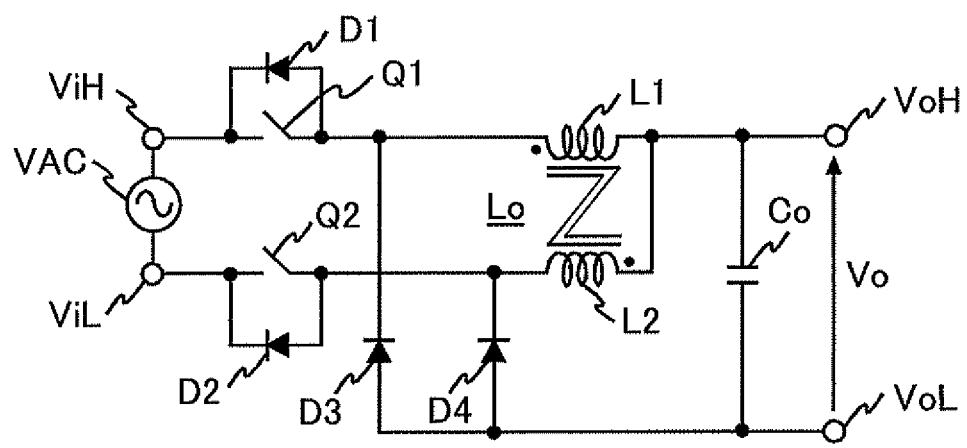
FIG. 1 is a circuit diagram showing a configuration of a power-supply device according to the first embodiment of the present invention.

The first embodiment of the present invention will be explained. FIG. 1 is a circuit diagram showing a configuration of the power-supply device according to the first embodiment of the present invention. As illustrated in FIG. 1, both ViH and ViL show input terminals, and both VoH (a High side) and VoL (a Low side) show output terminals.

The input terminal ViH is connected to a cathode of a diode D3 and one end of an inductor L1 (a side of black circle mark: FIG. 1), via a switch Q1.

The other end of the input terminal ViL is connected to a cathode of a diode D4 and one end of an inductor L2 (a counter side of a black circle mark: FIG. 1), through the switch Q2.

Further, the output terminal VoH is connected to one end of an output capacitor Co (a positive polarity side: the polarity is not shown), the other end of the inductor L1 (a counter side of a black circle mark: FIG. 1), and the other end of the inductor L2.

The other end of the output terminal VoL is connected to the other end of the output capacitor Co (a negative electrode: the polarity is not shown), and each of anodes of the diode D3 and the diode D4.

Further, the both ends of the input terminals ViH, ViL are connected to the AC input voltage VAC so that the AC power is applied.

Further, the both ends of the output terminals VoH and VoL is output of the DC output voltage Vo, and a load is connected.

In addition, diodes D1 and D2 are connected in parallel with the switches Q1 and Q2 which are composed of semiconductor elements, for example, MOSFET (Metal-Oxide-Semiconductor Field-Effect Transistor). These diodes D1 and D2 mean body diodes incidental to (parasitizing) the switches Q1 and Q2 respectively.

Further, the inductor L1 and the inductor L2 are coupled each other to form a coupling inductor Lo whose polarity is indicated by a dot (black circle mark) in FIG. 1. In addition, the diode D3 and the diode D4 function as a flywheel diode.

Note that, an underlined Lo in FIG. 1 indicates that Lo is a coupling inductor.

Here, the first buck converter includes a basic circuit consisting of the switch Q1 (a first power semiconductor switching element), the diode D3 (a first diode), the inductor L1 (a first inductor), and the output capacitor Co, each of which is a component of the circuit needed for an original operation of the buck converter. Furthermore, the first buck converter includes an additional circuit consisting of the diode D4 (a second diode) and the diode D2 (a second body diode).

Further, the second buck converter includes a basic circuit consisting of the switch Q2 (a second power semiconductor switching element), the diode D4 (the second diode), the inductor L2 (a second inductor), and the output capacitor Co, each of which is a component of the circuit needed for the original operation of the buck converter. Furthermore, the second buck converter includes an additional circuit consisting of the diode D3 (the first diode) and the diode D1 (a first body diode).

In addition, as shown in FIG. 1, the circuit which is composed of the first buck converter and the second buck converter has a function for the PFC converter. When the switch Q1 and the switch Q2 of the buck converter are switched ON and OFF, as described below, a current of harmonic components generated from an input current flowing from the input terminals ViH, ViL varies. However, if an ON/OFF period or an ON/OFF ratio of switches Q1 and Q2 is determined appropriately, a waveform of the input current can be approximated to a sine wave after the harmonic components of input current is removed. That is to say, the circuit in FIG. 1 can correct a power factor as the PFC converter, adding the function of the buck converter.

<<Operation of Power-Supply Device and a Time Chart>>

Next, the operation of the power-supply device of the present invention will be explained with reference to a time chart of FIG. 2.

Figure 2:
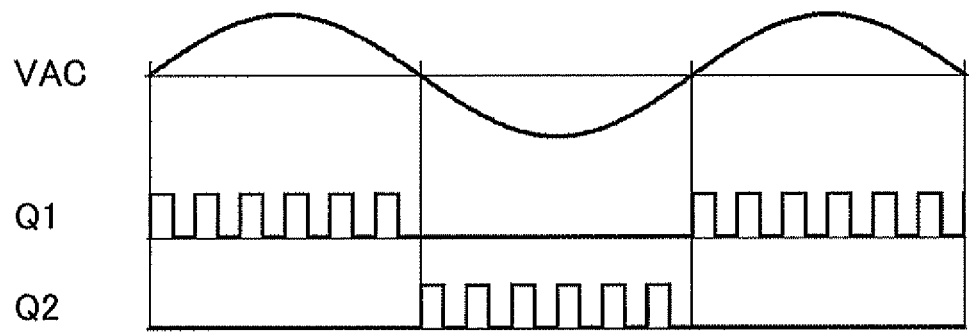
FIG. 2 is time charts of voltage waveform of each position of the power-supply device according to the first embodiment of the present invention.

In FIG. 2, controlling signals applied to the switches Q1 and Q2 are shown with controlling signal waveforms of controlling signals Q1 and Q2. While the controlling signal waveforms are High (high voltage), the switches Q1 and Q2 (refer to FIG. 1) are kept ON, and while Low (low voltage), the switches Q1 and Q2 are kept OFF. The controlling signals Q1 and Q2 are controlled by a PWM (Pulse Width Modulation) pulse, so that the DC output voltage Vo is generated between both ends of the output capacitor Co from the AC input voltage VAC using the above-mentioned two buck converter.

Therefore, applying the controlling signal Q1, the switch Q1 of the first buck converter performs a step-down operation during the positive half-cycle period of the AC input voltage VAC.

Further, applying the controlling signal Q2, the switch Q2 of the second buck converter performs a step-down operation by the PWM control during the positive half-cycle period of the AC input voltage VAC.

In addition, in FIG. 2, although the PWM pulse is illustrated as if it has a constant interval, an on-pulse width varies according to a control state in effect.

<<Operation During the Positive Half-Cycle Period of the AC Input Voltage VAC>>

At first the operation during the positive half-cycle period of the AC input voltage VAC will be explained. In this positive half-cycle, the electric potential of the input terminal ViH is higher than the electric potential of the input terminal ViL.

In this positive half-cycle, as shown in FIG. 2, the switch Q1 is switched alternately ON and OFF as it is controlled by the PWM pulse. First, when the switch Q1 is turned ON, energy supplied from the AC input voltage VAC (an electric energy, hereinafter described merely "energy") flows from the input terminal ViH, through the switch Q1, the inductor L1, the output capacitor Co, the diode D4, the diode D2, and the input terminal ViL. Therefore, the energy is accumulated in the output capacitor Co, and increases the voltage across the output capacitor Co.

At this time, the energy flowing through the inductor L1 is increasing at a rate corresponding to the slope of (VAC−Vo)/L1, therefore the energy is transmitted as well to the inductor L2 which is coupled with L1 to form a coupling inductor Lo. As the direction of this energy (the electric potential, the voltage) is so the direction of increasing the voltage across the output capacitor Co, this energy circulates (refluxes) through the diode D4.

Next, when the switch Q1 is turned OFF, the energy accumulated in the inductor L1 circulates through the output capacitor Co and the diode D3. Therefore, an accumulated energy of the inductor L1 is decreasing by the slope of (Vo/L1), and decreases the voltage across the output capacitor Co. At this time, the energy is transmitted as well to the inductor L2 which is coupled with L1 to form a coupling inductor Lo. The direction of this energy which is transmitted to the inductor L2 is so the direction of decreasing the voltage across the output capacitor Co. Therefore, this energy circulates through the diode D3.

In this way, the switch Q1 is switched alternately ON and OFF, so that in a steady state, the DC output voltage Vo obtained between the output terminal VoH and the output terminal VoL is obtained according to Vo=D×VAC. Where "VAC" is the AC input voltage applied between the input terminals ViH and ViL, and "D" is a duty controlled by the PWM pulse of the switch Q1.

As described above, the switch Q1 is continually switched ON and OFF while the switch Q2 is kept OFF. Therefore, in this period, only the first buck converter operates while the second buck converter kept stopped.

<<Operation During the Negative Half-Cycle Period of the AC Input Voltage VAC>>

Next, the operation during the negative half-cycle period of the AC input voltage VAC will be explained. In this period, the electric potential of the input terminal ViL is higher than the electric potential of the input terminal ViH.

As shown in FIG. 2, the switch Q2 is switched alternately ON and OFF as it is controlled by the PWM pulse.

First, when the switch Q2 is turned ON, the energy supplied from the AC input voltage VAC flows from the input terminal ViL through the switch Q2, the inductor L2, the output capacitor Co, the diode D3, the diode D1, and the input terminal ViH. Therefore, the energy is accumulated in the output capacitor Co, and increases the voltage between the both ends of the output capacitor Co.

At this time, the energy flowing through the inductor L2 is increasing at a rate corresponding to the slope of (VAC−Vo)/L2, therefore the energy is transmitted as well to inductor L1 which is coupled with L2 to form a coupling inductor Lo. The direction of the energy which is transmitted to the inductor L1 is so the direction of decreasing the voltage across the output capacitor Co. Therefore, this energy circulates through the diode D3.

Next, when the switch Q2 is turned OFF, the energy accumulated in the inductor L2 circulates through the output capacitor Co and the diode D4. Therefore, the accumulated energy of the inductor L2 is decreasing by the slope of (Vo/L2), and decreases the voltage across the output capacitor Co. At this time, the energy is transmitted as well to the inductor L1 which is coupled with L2 to form a coupling inductor Lo. The direction of this energy which is transmitted to the inductor L1 is so the direction of decreasing the voltage across the output capacitor Co. Therefore, this flow of energy circulates through the diode D4.

In this way, the switch Q2 is switched alternately ON and OFF, so that in a steady state, the DC output voltage Vo obtained between the output terminal VoH and the output terminal VoL is obtained according to Vo=D×VAC. Where "D" is the duty controlled by the PWM pulse of the switch Q2.

As described above, the switch Q2 is continually switched ON and OFF while the switch Q1 is kept OFF. Therefore, in this period, only the second buck converter operates while the first buck converter kept stopped.

Here, the advantage of the inductor L1 and the inductor L2 being coupled as the coupling inductor Lo instead of the inductor L1 and the inductor L2 being used independently will be explained using the operation during the positive half-cycle period of the AC input voltage VAC.

<<Case in which the Inductor L1 and the Inductor L2 are Used Independently>>

At first, in the case in which the inductor L1 and the inductor L2 are used independently, the energy supplied from the AC input voltage VAC, as shown in FIG. 2, flows a current to flow through a path described below, when the switch Q1 is turned ON.

As shown in FIG. 1, the path from the input terminal ViH through the switch Q1, the inductor L1, the output capacitor Co, the diode D4, the diode D2, and the input terminal ViL. Hereby, the first ordinary buck converter is formed by these elements.

However, not only the above-described path is formed, but also a circuit through which a current flows from the input terminal ViH, through the switch Q1, the inductor L1, the inductor L2, the diode D2, and the input terminal ViL.

Consequently, the energy flowing back to the input terminal ViL is accumulated in the inductor L2. This accumulated energy in the inductor L2 keeps momentum to flow in the same direction shortly after the switch Q1 is turned OFF. However, this flow is blocked by the switch Q1 being turned OFF, and further by the diode D1 which is connected in parallel with the switch Q1 and whose polarity is opposite to this flow.

For this reason, occurs a problem that the path through which the accumulation energy of the inductor L2 flows disappears.

<<Case in which the Inductor L1 and the Inductor L2 are Coupled>>

Next, when the inductor L1 and the inductor L2 are coupled with each other and constitute a coupling conductor Lo, the energy is accumulated in the inductor L2 when the switch Q1 is turned ON in the same way described above. In this case, the direction of the accumulated energy in the inductor L2 is to be changed into accumulated energy in an opposite direction when the inductors L1 and L2 are used independently.

Furthermore, when the switch Q1 is turned ON, the direction of the accumulated energy in the inductor L1, is to be changed into accumulated energy in an opposite direction when the inductors L1 and L2 are used independently.

By adopting such measures, the path of the accumulated energy of the inductor L2 and the inductor L1 can be ensured.

The method described above is intended to ensure the path of the accumulated energy of the inductor L2 and the inductor L1. To accomplish it, a coupling coefficient on a coupling inductor of the inductor L1 and the inductor L2 is preferable to be more than 0.9. This value is involved in a class of tight coupling as the coupling inductor, and having the advantage of the facility of manufacturing.

In the present embodiment, in whichever cycle period the AC input voltage VAC is between the positive cycle period and the negative cycle period, the output capacitor Co obtains constantly the DC output voltage Vo without the diode bridge. Therefore, the present embodiment can do without the diode bridge, and the number of the magnetic component of the inductor can be reduced to 1, and the like, it is possible to drastically reduce the number of components. Consequently, a low-cost power-supply device can be provided.

<<Other Time Chart for Operating the Power-Supply Device>>

Figure 3:
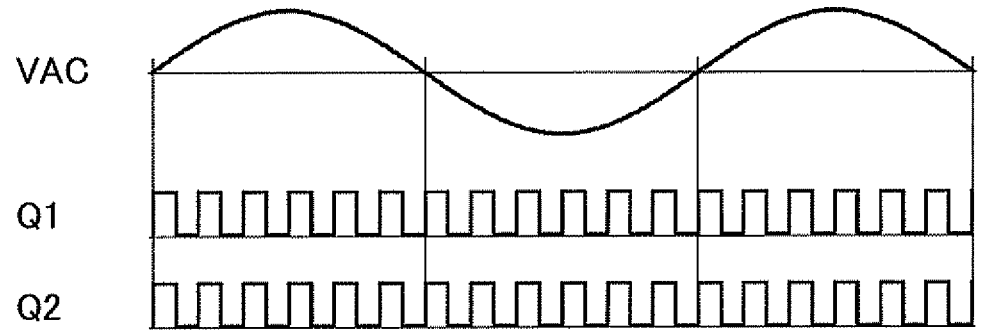
FIG. 3 is time charts of voltage waveform of other each position of the power-supply device according to the first embodiment of the present invention.

FIG. 3 shows another time chart for operating the first embodiment of the power-supply device of the present invention in FIG. 1.

According to the timing of the operation this time chart, the control signal Q1 and the control signal Q2 are controlled by the PWM pulse, and each of the switch Q1 and the switch Q2 is switched ON and OFF, whether the AC input voltage VAC is in the positive or negative cycle period.

Thus, the positive half cycle period of the AC input voltage VAC, in the OFF state the switch Q2 in FIG. 2, all current flowing in the diode D2, by on and oil the switch Q2, the current become to flow through the switch Q2 intermittently.

Comparing the resistance of the diode D2 in the conduction with the resistance of the switch Q2 in the conduction, the resistance of the switch Q2 is lower than that of the diode D2. Therefore, a conductive loss can be reduced, which reduce an energy loss.

In addition, generating a side path by connecting the diode D2 in parallel with the switch Q2, the resistance of the circuit becomes much lower, which leads to a further reduction of the conductive loss.

In the same way, during the negative half cycle period of the AC input voltage VAC, the current is alternately made to flow through the switch Q1 and stopped from flowing. In this way, the current whole of which was flowing through the diode D2 or the diode D1 by the control shown in FIG. 2 is made to flow through the switch Q2 or the switch Q1 which has the low ON-resistance as described above. Therefore, the conductive loss can be reduced, and the low energy loss can be realized by the combination of the switch and the diode.

In addition, the switches Q2 and Q1 which are kept continually ON in the conductive period of the diodes D2 and D1 can enlarge the effect of further reducing the conductive loss.

<<Other Time Chart for Operating the Power-Supply Device>>

Figure 4:
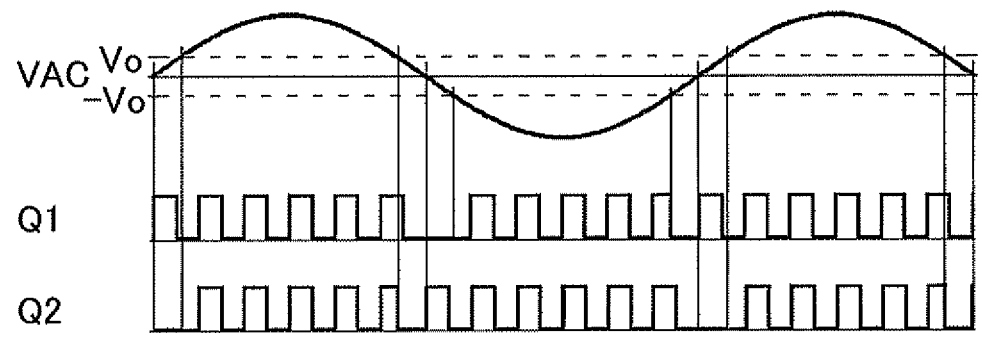
FIG. 4 is time charts of voltage waveform of further other each position of the power-supply device according to a first embodiment of the present invention.

FIG. 4 shows still other time chart for operating the first embodiment of the power-supply device of the present invention in FIG. 1.

In the control of the time chart in FIG. 3, the switch Q1 and the switch Q2 are continually controlled by the PWM pulse. Therefore, when the value of the AC input voltage VAC is smaller than the value of the DC output voltage Vo, the DC output voltage accumulated on the output capacitor Co could be discharged to the AC input side.

This phenomenon becomes significant when the value of the inductor L1 or the inductor L2 is small. This phenomenon is effectively avoided by using the control of the time chart in FIG. 4.

On the other hand, according to the control method shown in FIG. 4, the switch Q1 and the switch Q2 are kept OFF when the AC input voltage VAC is smaller than the DC output voltage Vo during the conductive period of the diode D2 or D1 by the control of FIG. 2, and the switch Q1 and the switch Q2 are controlled by the PWM pulse when the AC input voltage VAC is larger than the DC output voltage Vo.

Due to this control method, when the AC input voltage VAC is smaller than the DC output voltage Vo, the DC output voltage generated on the output capacitor Co can be prevented from being discharged to the AC input side.

Second Embodiment

Figure 5:
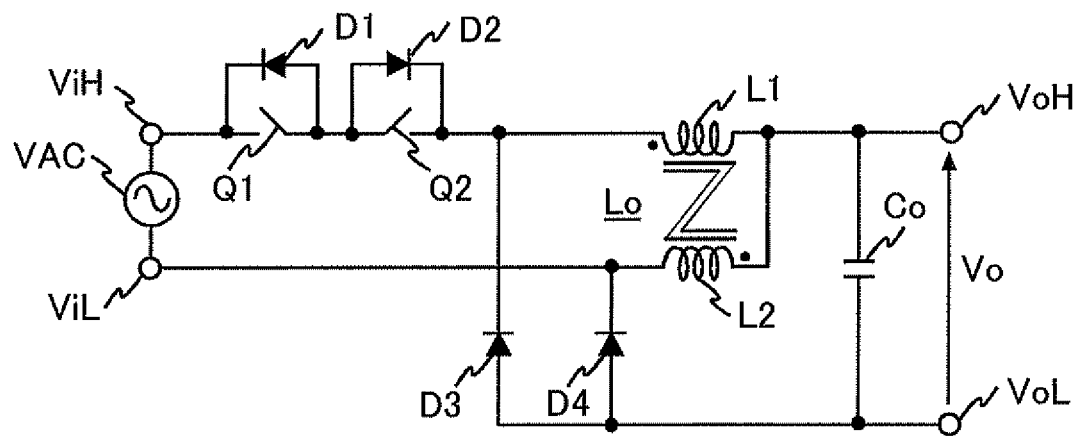
FIG. 5 is a circuit diagram showing a configuration of the power-supply device according to a second embodiment of the present invention.

FIG. 5 shows the second embodiment of the power-supply device to which the present invention is applied. The second embodiment is different from the first embodiment of FIG. 1 in that the switch Q2 is, in a direction shown in FIG. 5, connected in series with the switch Q1. Except for the switch Q2, an explanation will be skipped as it is the same in FIG. 1.

In FIG. 5, during the positive half cycle period of the AC input voltage VAC, the positive voltage is input from the input terminal ViH by the ON/OFF operation of the switch Q1, and the diode D2 operates in a forward direction.

Therefore, the energy supplied from the input terminal ViH flows through the path of the input terminal ViH, the switch Q1, the diode D2, the inductor L1, the output capacitor Co, the diode D4, and the input terminal ViL. Consequently, the operation and the function of the first buck converter become similar to the ON/OFF operation of the switch Q1 in FIG. 1.

Furthermore, during the negative half cycle period of the AC input voltage VAC, the negative voltage is input from the input terminal ViH by the ON/OFF operation of the switch Q2, and the diode D1 operates in the forward direction.

Therefore, the energy supplied from the input terminal ViL flows through the path of the input terminal ViL, the inductor L2, the output capacitor Co, the diode D3, the switch Q2, the diode D1, and the input terminal ViH. Consequently, the operation and the function of the second buck converter become similar to the ON/OFF operation of the switch Q2 in FIG. 1.

In this way, the switches Q1 and Q2 can be operated by the control shown in any of FIG. 2 to FIG. 4, therefore the effect similar to the effect which is obtained in FIG. 1 is obtained. In addition, the switches Q1 and Q2 can be disposed collectively, they become to be driven easily.

Third Embodiment

Figure 6:
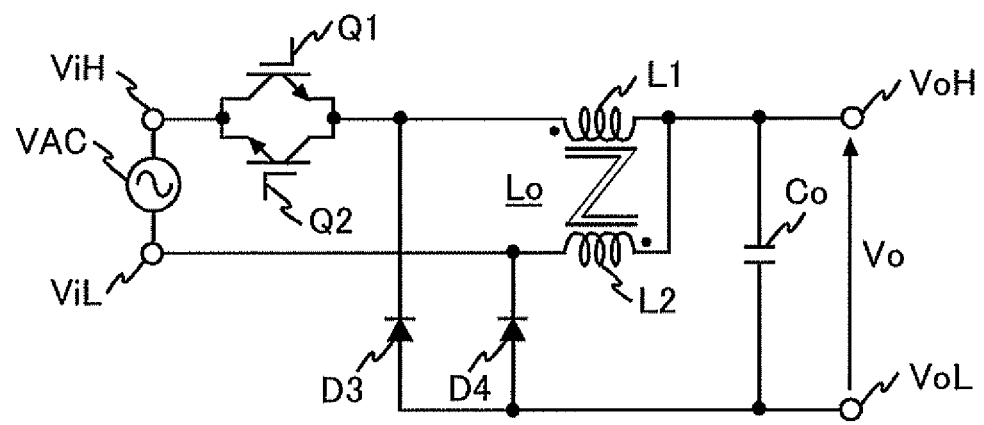
FIG. 6 is a circuit diagram showing a configuration of the power-supply device according to a third embodiment of the present invention.

FIG. 6 is a circuit diagram showing the configuration of the third embodiment of the power-supply device of the present invention.

FIG. 6 is different from FIG. 1 in that the switch Q1 and the switch Q2 are arrayed alternately, and connected in parallel.

Comparing FIG. 6 with FIG. 1 or FIG. 5, the switch Q1 and the switch Q2 are substituted by reverse blocking TGBT (insulated Gate Bipolar Transistor), and the diode D1 and the diode D2 are removed. The other part of the circuit in FIG. 6 is the same as FIG. 1 or FIG. 5. Therefore, an explanation except to the switch Q1 and the switch Q2 will be skipped.

In FIG. 6, during the positive half cycle period of the AC input voltage VAC, the energy supplied from the input terminal ViH flows through the path of the input terminal ViH, the switch Q1, the inductor L1, the output capacitor Co, the diode D4, and the input terminal ViL by the ON/OFF operation of the switch Q1. The operation and the function of the first buck converter are similar to the ON/OFF operation of the switch Q1 in FIG. 1.

Furthermore, during the negative half cycle period of the AC input voltage VAC, the energy supplied from the input terminal ViL flows through the path of the input terminal ViL, the inductor L2, the output capacitor Co, the diode D3, the switch Q2, and the input terminal ViH. The operation and the function of the second buck converter are similar to the ON/OFF operation of the switch Q2 in FIG. 1.

In the circuit shown in FIG. 6, the switches Q1 and Q2 can be operated by the control shown in any of FIG. 2 to FIG. 4, the effect similar to FIG. 1 is obtained. In this case, the above-described reverse blockings IGBT, or the power semiconductor switching elements having a function of reverse blocking can be used for the switches Q1 and Q2.

<<Method for Obtaining a Detection Information of a Current and a Voltage>>

Next, in relation to the first embodiment, the method for obtaining the detection information of the current and the voltage which is necessary for a determination of an operation timing of the switches Q1 and Q2 will be explained.

Figure 7:
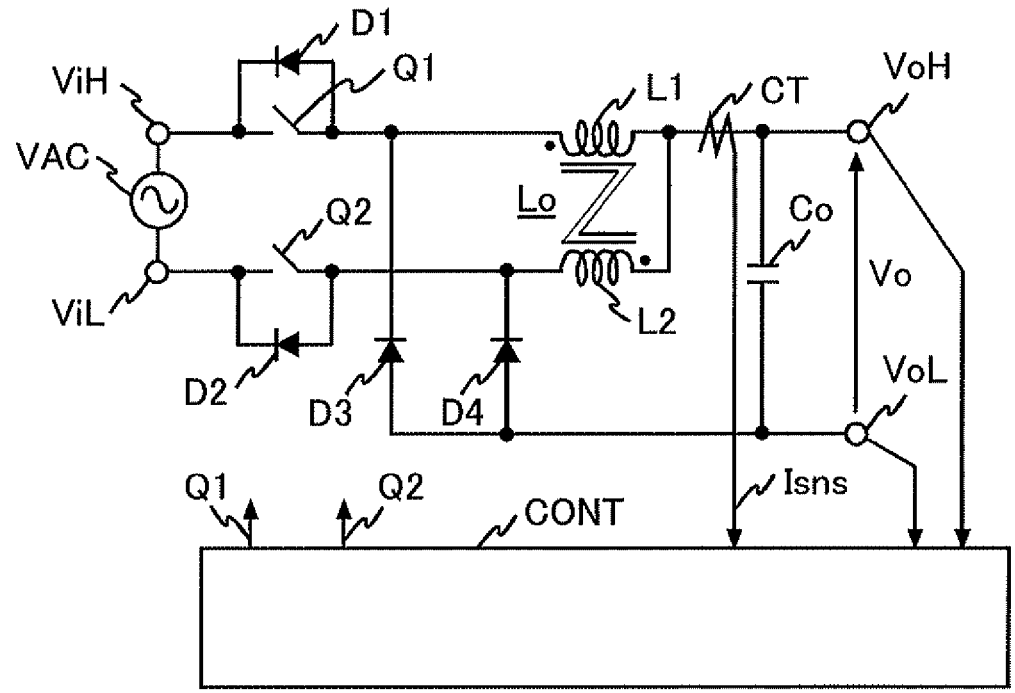
FIG. 7 is a circuit diagram showing a current sense by a current transformer on the power-supply device according to the first embodiment of the present invention.

FIG. 7 is a circuit diagram showing a current sense (a current detection) by a current transformer CT of the power-supply device of the first embodiment of the present invention.

As shown in FIG. 7, between the output terminal VoH and the coupling inductor La, the current transformer CT is disposed and a sense (detection) current Isns is detected. Further, the DC output voltage Vo is detected between the output terminal VoH and VoL. Then the sense current Isns and the DC output voltage Vo are supplied to a control circuit CONT.

In the control circuit CONT, the timing of the PWM pulse shown in FIG. 2 to FIG. 4 is generated.

Furthermore, the control circuit CONT also has a function for controlling the correction of the power factor.

Note that in FIG. 2 to FIG. 4, the PWM pulses are illustrated with a constant on-pulse width. However, in fact, the on-pulse width (a pulse width at ON) of the PWM pulse varies as the AC voltage (a sine wave) is input. For the reason of the description, the PWM pulses are illustrated schematically.

Figure 8:
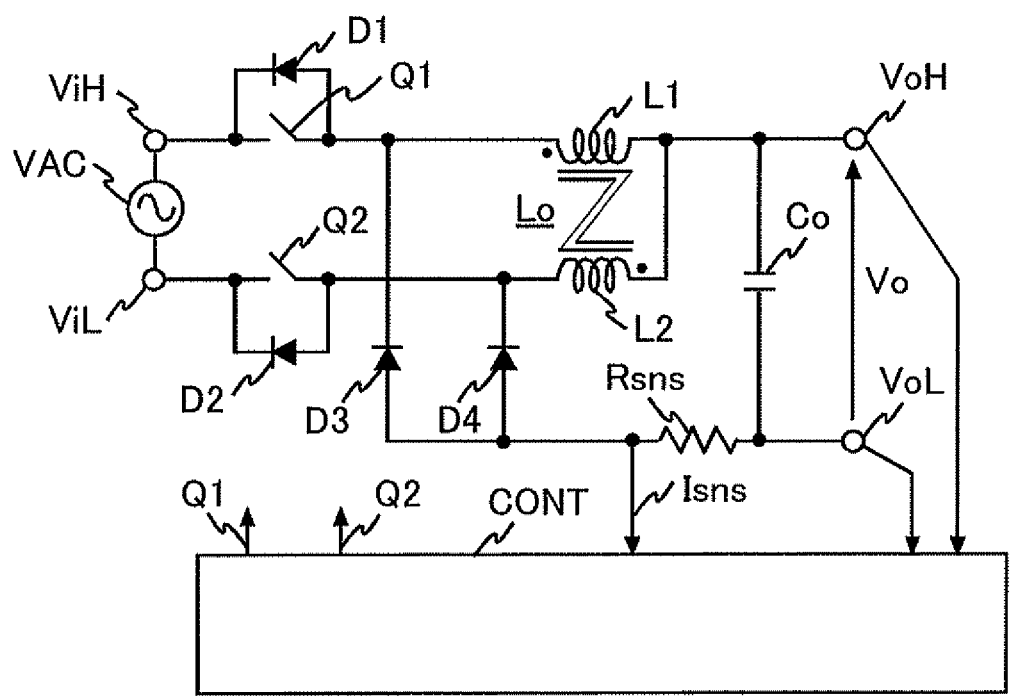
FIG. 8 is a circuit diagram showing a current sense by a sense resistance on the power-supply device according to the first embodiment of the present invention.

FIG. 8 is a circuit diagram showing how a current is sensed with a sense resistance of the power-supply device of the first embodiment of the present invention.

The detection method of the sense current Isns is as shown in FIG. 8, the sense resistance Rsns is used to detect the sense current Isns by converting to a voltage, instead of the current transformer CT.

In FIG. 8, the sense resistance Rsns is provided between the negative side terminal of the output capacitor and the anode terminal of the diode D3 and D4 (the current path of a low-electric-potential side of the capacitor).

In this way, although the AC voltage is dealt with, the current can be detected at only one position without a rectifier circuit using a diode bridge. Therefore, the detection circuit become simple, and a low cost is realized.

The above are explanation described also in the first embodiment. In the embodiments described below (the second embodiment to the fourth embodiment), it is easy to generate the operation timing of a necessary switch, using the similar detection information.

Fourth Embodiment

Figure 9:
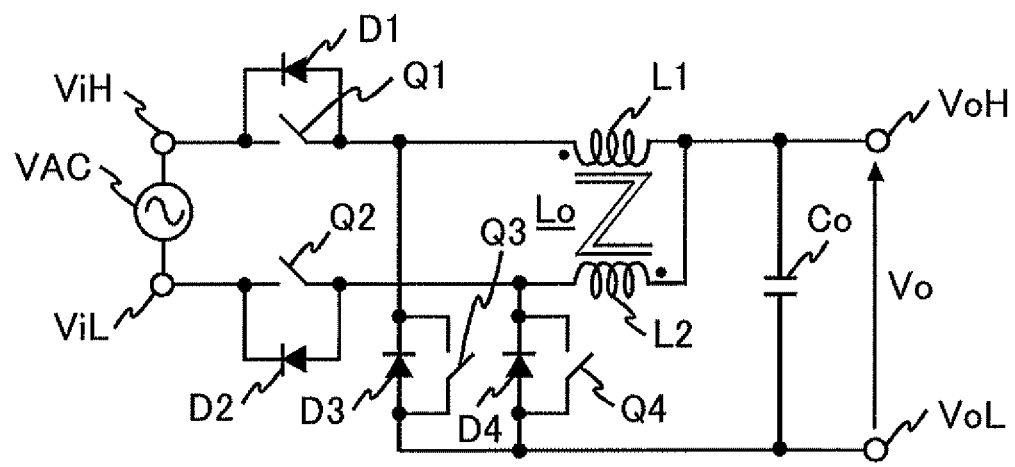
FIG. 9 is a circuit diagram showing a configuration of the power-supply device according to a fourth embodiment of the present invention.

FIG. 9 is a circuit diagram showing the configuration of the fourth embodiment of the power-supply device of the present invention.

FIG. 9 is different from FIG. 1 in that the switches Q3 and Q4 are connected respectively to the diodes D3 and D4 in parallel. Due to this configuration, a synchronous rectifier operation is performed using the switches Q3 and Q4 instead of the rectifier operation by the diodes D3 and D4. In this case, the diodes D3 and D4 can be substituted by the body diodes connected with the switches Q3 and Q4 respectively.

Except for the above, FIG. 9 shows the similar circuit to FIG. 1, and the used components which are common to FIG. 1 are indicated by the same numeral numbers. In respect of the similar components, the explanation is skipped.

Figure 10:
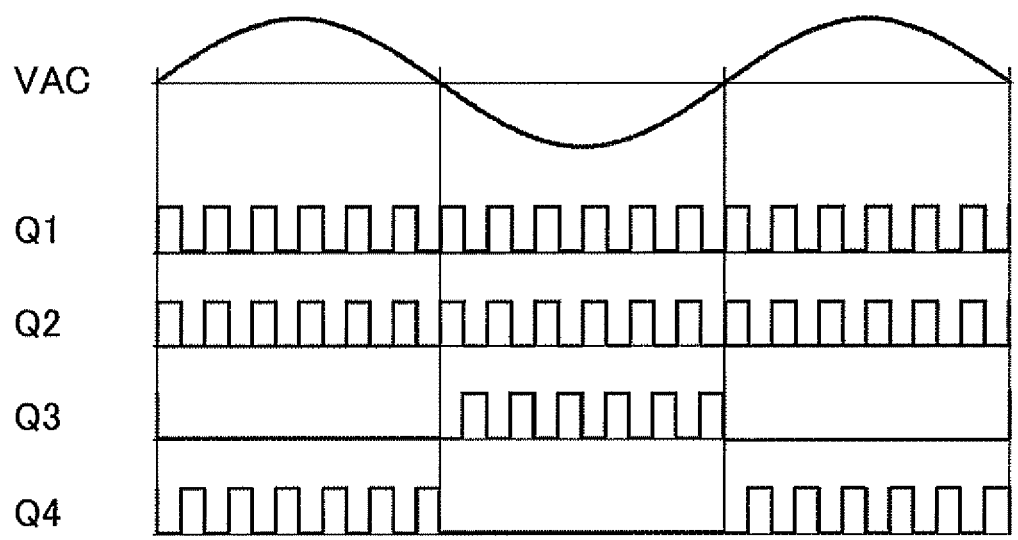
FIG. 10 is time charts of voltage waveform of each position of the power-supply device according to the fourth embodiment of the present invention.

FIG. 10 is a time chart showing the waveform of voltage of each portion in the power-supply device of the fourth embodiment of the present invention.

In FIG. 9, the switches Q3 and Q4 perform the synchronous rectifier operation. This synchronous rectifier operation is performed according to the time chart of the control signals Q3 and Q4 of FIG. 10. That is to say, only in a period when the diode D3 or the diode D4 is conductive, the switch Q3 or the switch Q4 needs to be kept ON. Therefore, the switches Q3 and Q4 are switched on and off according to the control signals Q3 and Q4 of FIG. 10.

Here, for the control signals Q3 and Q4, is used the PWM pulse whose ON/OFF pulse are inverted, and which determines the relationship of the input and output voltage of the buck converter.

In this way, the time chart is formed when the diodes D3 and D4 flow the current forward, the switches Q3 and Q4 are turned ON. Therefore, the circuit of the fourth embodiment of FIG. 9 becomes functionally homologous in effect to the circuit of FIG. 1, resulting in the same behavior.

Consequently, when the diodes D3 and D4 are operating in a forward direction, the switches Q3 and Q4 are turned ON. Therefore, the ON-resistance in conductive condition of FIG. 9 is smaller than that of FIG. 1. Therefore, a conduction loss can be reduced, furthermore, a low energy loss is expected.

Fifth Embodiment

Figure 11:
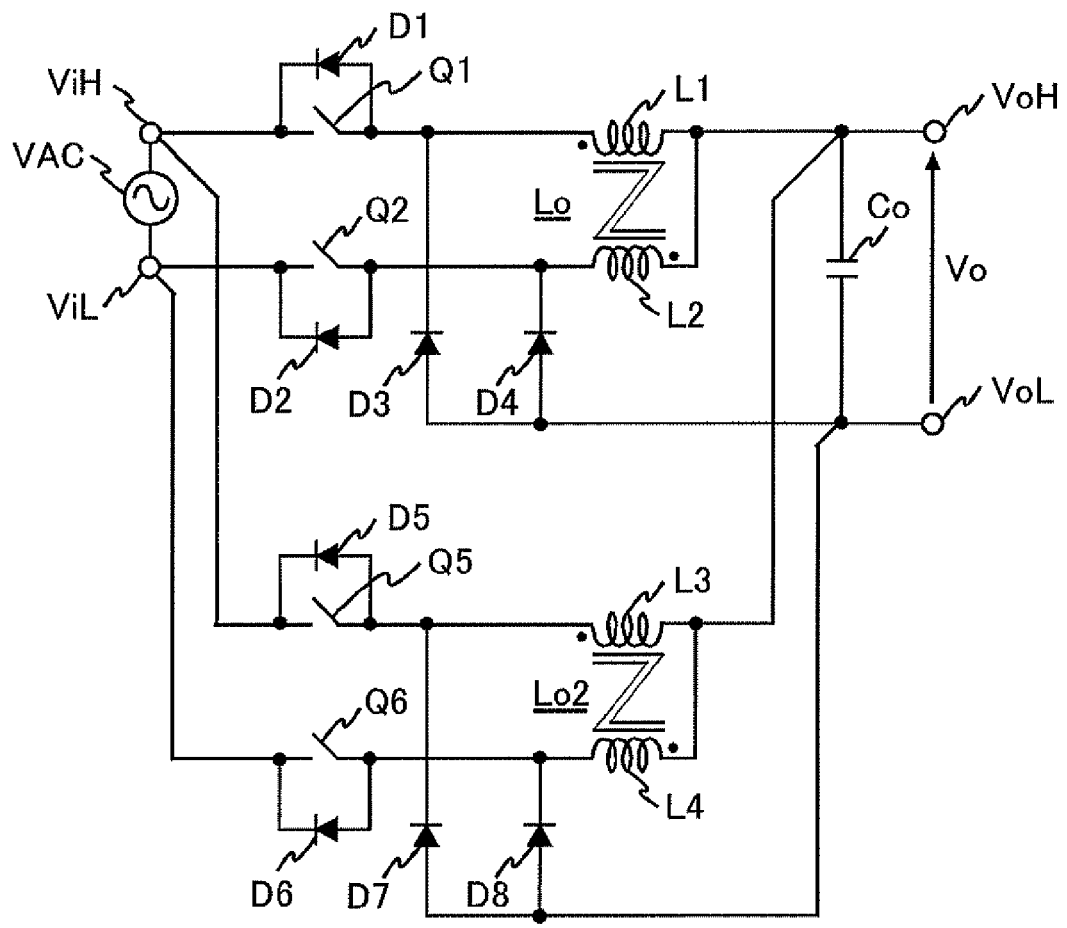
FIG. 11 is a circuit diagram showing a configuration of the power-supply device according to a fifth embodiment of the present invention.

FIG. 11 is the circuit diagram showing the configuration of the fifth embodiment of the power-supply device of the present invention.

The circuit has a feature that the circuit comprises two systems of a basic circuit of the power-supply device which includes the switches Q1 and Q2, the diodes D1, D2, D3, D4, and the inductors L1, L2, Lo, and that there is a phase difference of 180 degrees between the first circuit and the second circuit to have the circuit operated in interleaved operation. However, the output capacitor Co, the AC power input into (the AC input voltage VAC), the input terminals ViH and ViL, and the output terminals VoH and VoL are common among the first and second circuits.

Therefore, to the circuit of FIG. 1, the third and fourth buck converters formed by the switches Q5 and Q6, the diodes D5 and D6, the diodes D7 and D8, and the coupling inductor Lo2 which is formed by connecting the inductors L3 and L4 are added.

In addition, the diodes D5 and D6 are the body diodes connected with (parasitizing) the switches Q5 and Q6 respectively.

Figure 12:
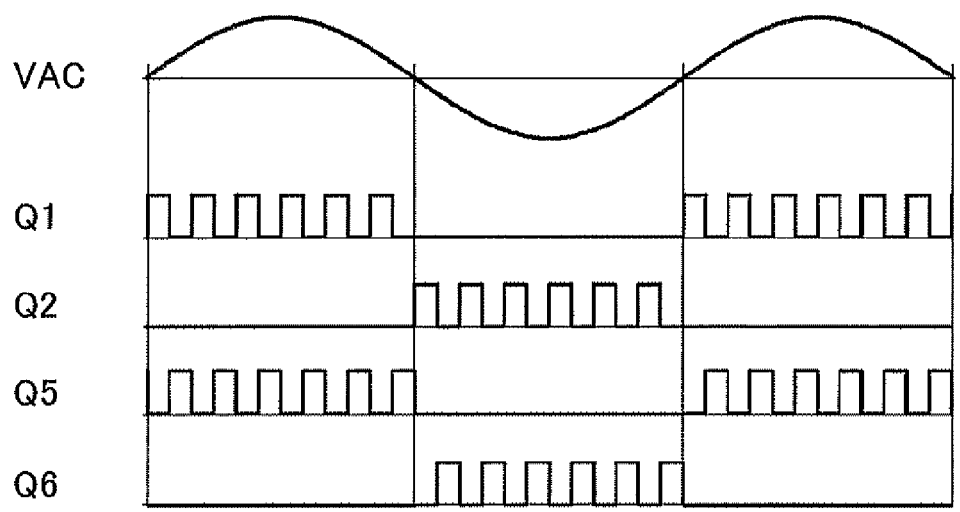
FIG. 12 is time charts of voltage waveform of each position of the power-supply device according to the fifth embodiment of the present invention.

FIG. 12 is a time chart showing a waveform of voltage of each portion in the power-supply device of the fifth embodiment of the present invention.

In FIG. 12, during the positive half cycle period of the AC input voltage VAC, there is a phase difference of 180 degrees in a positive or a negative timing between the control signals Q1 and Q5. Further, during the negative half cycle period of the AC input voltage VAC, the control signals Q2 and Q6 are in the opposite phase 180 degrees different from each other in the positive or negative timing.

By operating the switches Q1, Q2, Q5, and Q6 of FIG. 11 at the timing shown in FIG. 12, the above described two systems of the power-supply device performs the interleaved operation. Therefore, the effect of a reduction of an output ripple is obtained.

Note that the timing of FIG. 12 is shown based on the control of the timing of FIG. 2, however, it is possible to use the control of the timing of FIG. 3 or FIG. 4.

In addition, in FIG. 11, the output capacitor Co is used for the coupling inductors Lo and Lo2. However, they do not necessarily need to be only one capacitor. For example, the circuit that two output capacitors Co are connected respectively between the output capacitors VoH and VoL, can be used. In this example, one output capacitor Co is disposed on the side of the coupling inductor Lo which is formed by coupling the inductor L1 and the inductor L2, and the other output capacitor Co is disposed on the side of the coupling inductor Lo2 which is formed by coupling the inductor L3 and the inductor L4. In this way, two output capacitors Co turn out to be a relationship of parallel connection, and they electrically compose one common output capacitor Co.

Sixth Embodiment

Next, the sixth embodiment of the power-supply device will be shown.

Figure 13:
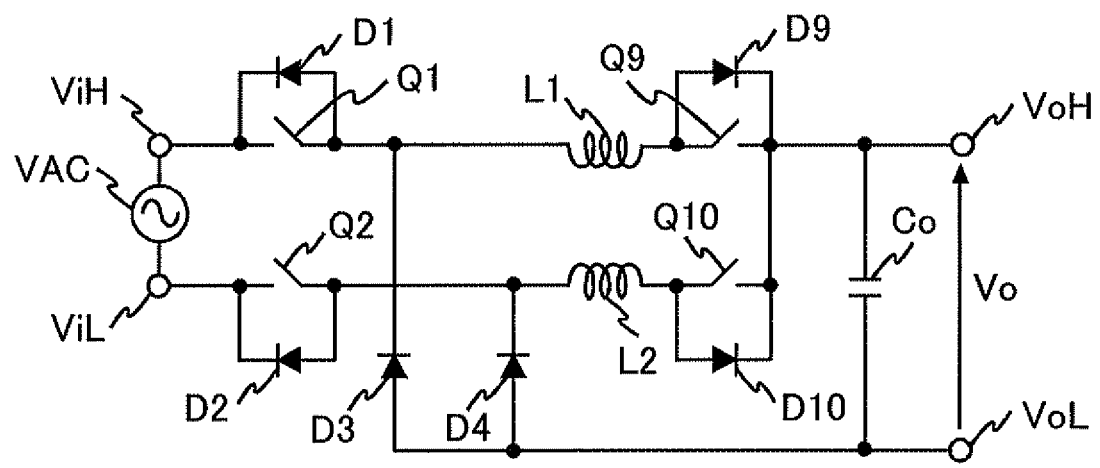
FIG. 13 is a circuit diagram showing a configuration of the power-supply device according to a sixth embodiment of the present invention.

FIG. 13 is a circuit diagram showing the configuration of the sixth embodiment of the power-supply device of the present invention.

A method of the sixth embodiment is not that the direction of the accumulated energy of the inductor is varied as described above, but that the energy is not accumulated in the inductor.

FIG. 13 is different from FIG. 1 in that, as substitute for the inductor L1, a serial circuit of the inductor L1 and the switch Q9 is disposed, and as substitute for the inductor L2, a serial circuit of the inductor L2 and the switch Q10 is disposed.

Here, the diodes D9 and D10 are the body diodes connected with the switches Q9 and Q10 respectively.

As the layout of other elements is the same as one of FIG. 1, an explanation is skipped.

Figure 14:
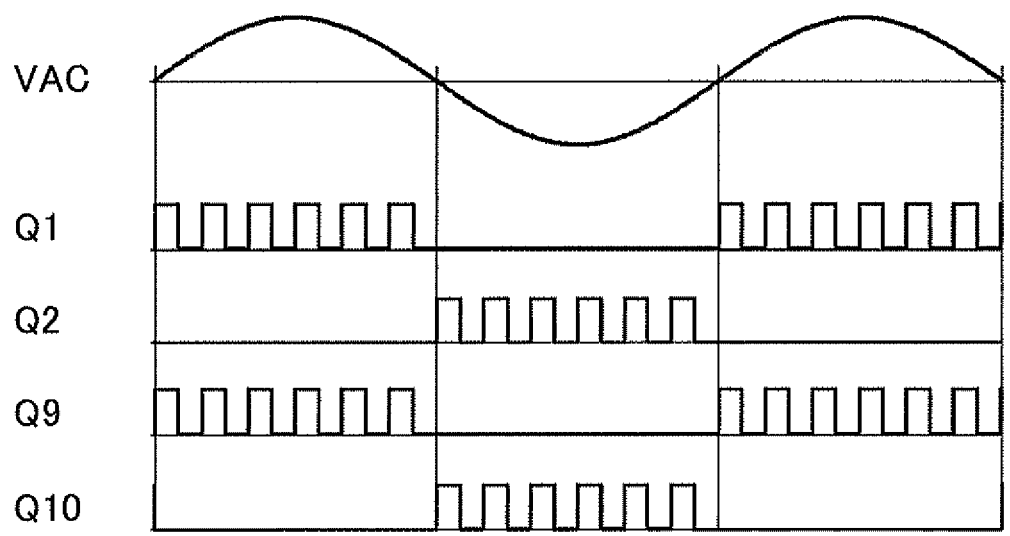
FIG. 14 is time charts of voltage waveform of each position of the power-supply device according to the sixth embodiment of the present invention.

FIG. 14 is a time chart showing a waveform of voltage of each portion in the power-supply device of the sixth embodiment of the present invention.

In the circuit of FIG. 13, the switches Q1, Q2, Q9, and Q10 are operated by the control signals of FIG. 14. At this time, during the positive half cycle period of the AC input voltage VAC, the switch Q10 is turned OFF, therefore, the energy is not accumulated in the inductor L2.

Consequently, the step-down operation similar to FIG. 1 is ensured, and the similar effect is obtained.

Further, in the present embodiment, by using the synchronous rectifier switch as a substitute for the diode, the conductive loss can be reduced as usual, the low energy loss can be realized.

Further, by using the embodiment of FIG. 1, the interleaved layout described in the fifth embodiment can be applied to the sixth embodiment of FIG. 13.

Seventh Embodiment

Next, as the seventh embodiment, is shown the embodiment of the LED (Light Emitting Diode) lighting equipment using the power-supply device of the present invention.

Figure 15:
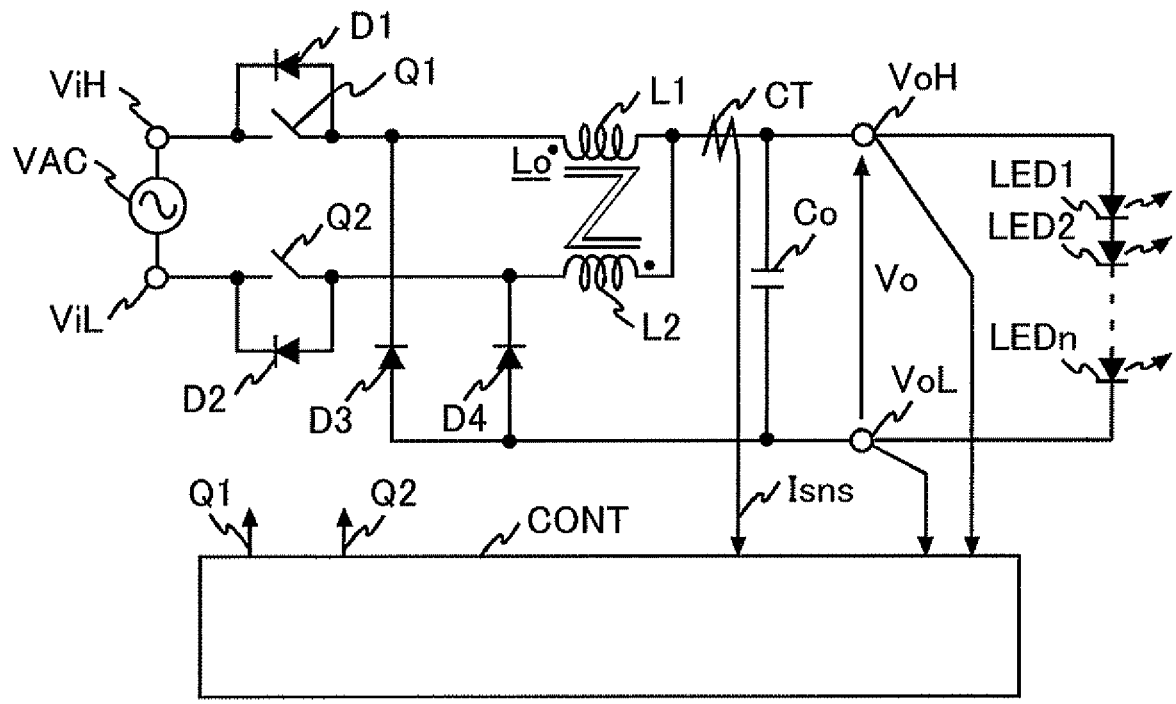
FIG. 15 is a circuit diagram of the power-supply device for an LED (Light Emitting Diode) lighting equipment according to a seventh embodiment of the present invention.

FIG. 15 is a circuit diagram showing the circuit of the power-supply device and the load (LED lighting equipment) in the LED lighting equipment of the seventh embodiment of the present invention.

In FIG. 15, a serial circuit of LED1 to LEDn, as loads, is connected to the circuit of the power-supply shown in FIG. 7.

As the power-supply device is explained above with reference to FIG. 7 and FIG. 1, an explanation which is redundant is skipped.

In FIG. 15, the DC power which is output from an AC input commercial power supply using the power-supply device shown in the above-described embodiments is supplied to the serial circuit of the LEDs (an LED1 to an LEDn) used in the LED lighting equipment, and controlled by the control circuit CONT so that a current flowing through the serial circuit of the LEDs (an LED1 to an LEDn) becomes constant. The circuit and control can cause the LEDs (an LED1 to an LEDn) to illuminate with a predetermined constant illumination.

Furthermore, In FIG. 15, the circuit of the power-supply device shown by FIG. 7 is expressed. However, any power-supply device of the first to sixth embodiments can be applied to the present embodiment.

By the LED lighting equipment like the present embodiment, using the power-supply device explained in the above-described first to sixth embodiments, the low cost can be realized by the reduction of the number of components, and the low energy loss can be realized by the reduction of the conductive loss. Therefore, small-sized, inexpensive LED lighting equipment can be provided.

Eighth Embodiment

Next, as the eighth embodiment, is shown the embodiment of an HDD (a Hard Disk Drive) device using the power-supply device of the present invention.

Figure 16:
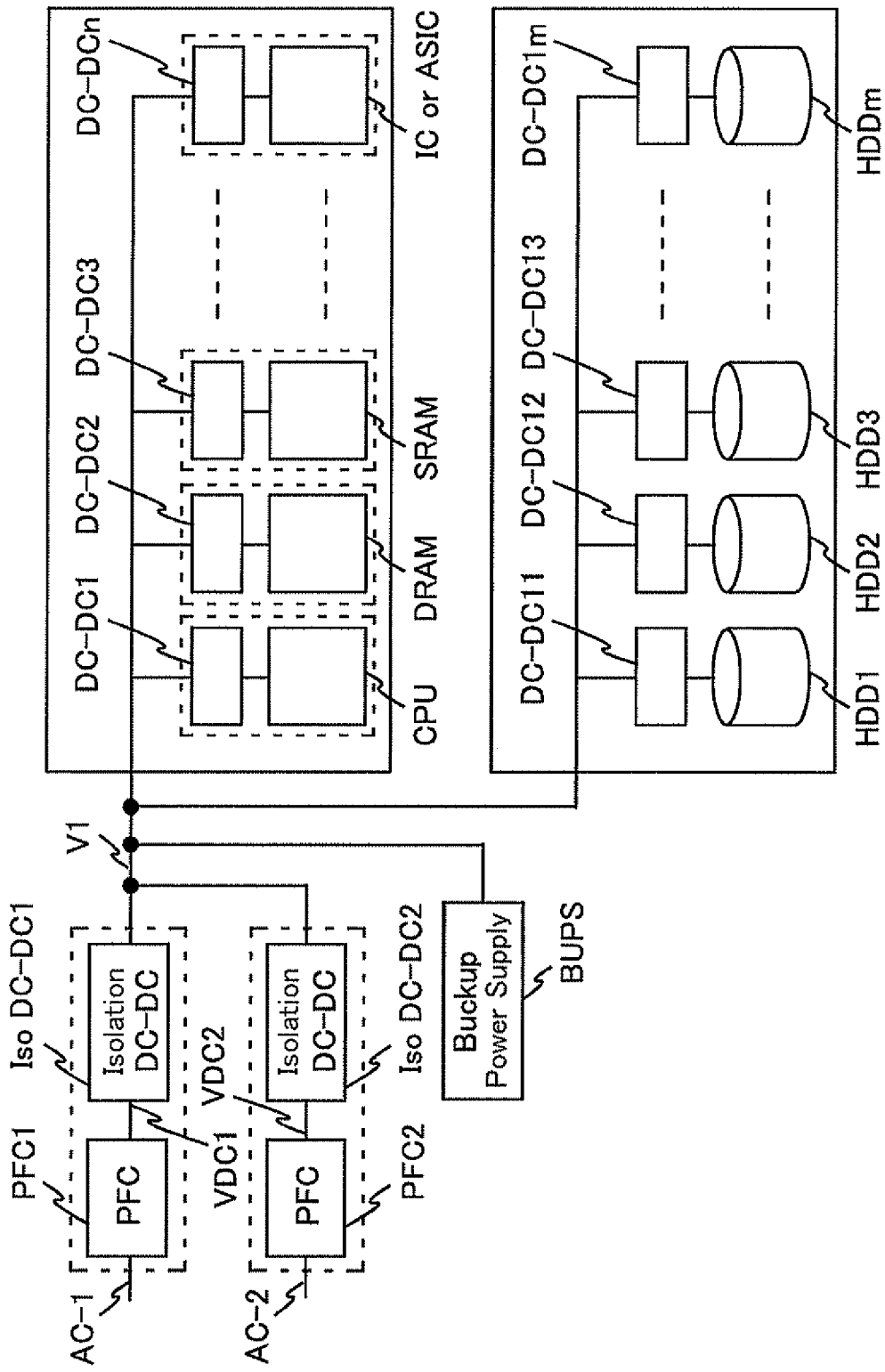
FIG. 16 is an illustrative drawing of the power-supply device for an HDD (Hard Disk Drive) device according to a eighth embodiment of the present invention.

FIG. 16 shows the HDD device to which the power-supply device of the present invention is applied.

The power-supply system in the HDD device forms the power-supply system of a parallel redundancy structure, and receiving the AC voltage, the power-supply system outputs the DC voltage V1, through the PFC converters PFC1 and PFC2 each of which is equipment of the first to the sixth embodiments, and an isolation type DC-DC converter (Iso DC-DC1), (Iso DC-DC2).

In addition, the power line of the AC power (AC line) supplying power to the PFC converters PFC1 and PFC2 is a different system as AC-1 and AC-2. The value of the AC voltage can be different from each other. Further, the values of the DC voltages of each of output voltages VDC1 and VDC2 of the PFC converters PFC1 and PFC2, can be different from each other.

The DC voltage V1 is connected with a backup power supply BUPS mounted with a battery, as a power failure protection. Further, this DC voltage V1 supplies a electric power to the HDD devices (HDD1 to HDDm) via a non-isolation type DC-DC converter (DC-DC1 to DC-DCm). The DC voltage V1 also supplies the electric power, which is a suitable voltage for each target device, to a processor CPU which handles a control for storing data in the HDD device, a high-speed large capacity memory DRAM, a SRAM, and a board composed of an IC, an ASIC and the like.

By the power-supply system or the equipment like the present (eighth) embodiment which uses the power-supply device explained in the above-described first to sixth embodiments, the low cost can be realized by the reduction of the number of parts, and the low energy loss can be realized by the reduction of the conductive loss. Therefore, small-sized power-supply system or the equipment can be obtained.

Furthermore, the PFC converter which is the power-supply device of the present invention provides a step-down type output. In this way, the rated voltage for the power semiconductor switching element to withstand is reduced. Similarly, an energy loss of a portion of the isolation type DC-DC converter is reduced. Here, the isolation type DC-DC converter which comprises the power semiconductor switching element is disposed in the latter part of the PFC converter. Therefore, if being deemed as the power-supply system or the equipment, a high efficiency can be expected adding to above-described small-sizing and reducing cost.

Other Embodiments

Note that in the fifth embodiment of the power-supply device of the present invention, the circuit which performs the interleaved operation by using two system of the circuit layout shown by the first embodiment of FIG. 1, is shown. However, the circuit layout to which the interleaved operation can be applied, is used not only the first embodiment of FIG. 1.

The circuit for interleaved operation can be formed by using respective two systems of the circuit layout not only from the circuit layout shown in the first embodiment, but also from the circuit layout shown in the second (FIG. 5), the third (FIG. 6), the fourth (FIG. 9), and the sixth (FIG. 13) embodiments.

Furthermore, the circuit layout for the interleaved operation can be formed by combining the different circuit layouts in the first, second, third, fourth, and sixth embodiments, to form 2 systems.

Furthermore, in the first to sixth embodiments of the power-supply device of the present invention, as shown in FIG. 7 and FIG. 8, the control of the DC output voltage is provided as the control circuit CONT (FIG. 7, FIG. 8) generates the PWM pulse. In addition to this PWM control, a control by which a switching frequency is varied can be used.

In this way, when an inductor current becomes a discontinuous mode because of a light load, the switching frequency can be increased by providing the control by which the switching frequency is varied in addition to the PWM control. Therefore, whatever a load condition is, the control with critical mode can be constantly provided, the low energy loss by reducing the conductive loss of the circuit can be expected.

Furthermore, the operation timing of the switches Q1 and Q2 generated in the control circuit CONT (FIG. 7, FIG. 8) can be carried out an operation not only by an analog control but also by a digital control.

To the digital control, a microcomputer, a DSP (Digital Signal Processor), and an ASIC (Application Specific Integrated Circuit) and the like can be used.

Furthermore, the switches Q1 to Q6 used in the first, second, and fourth to sixth embodiments of the power-supply device of the present invention are explained in the case of the MOSFET (Metal-Oxide-Semiconductor Field-Effect Transistor). However, the above-described IGBT (Insulated Gate Bipolar Transistor) can be used, and BJT (Bipolar Junction Transistor) or another appropriate transistor can be used.

Furthermore, in the present embodiment, it is necessary to use the switch of a low ON-resistance for the reduction of the conductive loss of the switches Q1 to Q10. Therefore, power semiconductor transistors such as a SiC (Silicon Carbide), GaN (Gallium Nitride), and the like can be used.

Furthermore, in the seventh embodiment, the LED lighting equipment used for the power-supply device of the first to sixth embodiments is shown. However, the mounting of the power-supply device of the present embodiment to a wide variety of equipment is not limited to this.

Since the power-supply device of the present embodiment is an application of the buck converter, it is a converter which can obtain the DC output voltage lower than the AC input. Therefore, the power-supply device of the non-isolation type AC-DC converter is suitable to the use of the electric appliance other than the LED lighting equipment.

Furthermore, in the eighth embodiment, the HDD device used the power-supply device of the first to sixth embodiments is shown. However, the mounting of the power-supply device of the present embodiment to a wide variety of equipment is not limited to this.

The power-supply device of the present embodiment can develop a possibility of application to a wide variety of industrial application equipment, the power-supply device for information and communication equipment, or general-purpose isolation type AC-DC converter, and the like, as a low-cost power-supply device.

Supplement of the Present Embodiment

The power-supply device of the present embodiment is composed of the two buck converters having the coupling inductor composed of the two mutually-coupled inductors, and the output capacitor. Out of the two buck converters, during the positive half-cycle period of the AC input voltage, the first buck converter is operated, and during the negative half-cycle period of the AC input voltage, the second buck converter is operated. In this way, the power-supply device obtains the DC output voltage between the both edges of the output capacitor from the AC input voltage.

Due to the configuration and the operation, the diode bridge may no longer necessary, and the number of the other component is reduced.

Furthermore, the switch is controlled by the PWM pulse during the conductive period of the body diode accompanying the switch. Further, the synchronous rectifier switch is controlled by the periodically-inverted pulse of the PWM pulse by using the synchronous rectifier switch instead of the diode during the conductive period of the diode. Due to this control, the low ON-resistance switch can be combined with the body diode or the diode, the conductive loss on the electric power is reduced, and the low energy loss is realized.

As explained above, by the present embodiment, a low-cost, low-energy-loss power-supply device can be provided.

What is claimed is:
1. A power-supply device comprising:
an AC-DC converter including a first buck converter and a second buck converter, the first and second buck converters sharing a coupling inductor, the coupling inductor including a first inductor and a second inductor that are electromagnetically-coupled with each other;

wherein the first buck converter includes:
the first inductor of the coupling inductor,
a first power semiconductor switching element configured to intermittently switch on and off a current flowing into the first inductor,
a first diode configured to circulate a current which flows out of the first inductor, when the first power semiconductor switching element is kept off,
an output capacitor,
a second diode configured to limit a reflex path of a current, when the first power semiconductor switching element is kept on, and
a second body diode connected in parallel with a second power semiconductor switching element,
wherein the second buck converter includes:
the second inductor of the coupling inductor,
a second power semiconductor switching element configured to intermittently switch on and off a current flowing into the second inductor,
the second diode configured to circulate a current which flows out of the second inductor, when the second power semiconductor switching element is kept off,
the output capacitor,
the first diode configured to limit a reflex path of a current, when the second power semiconductor switching element is kept on, and
a first body diode connected in parallel with the first power semiconductor switching element; and
wherein one end of the first inductor and one end of the second inductor are electrically connected with each other through a common junction point with which one end of the output capacitor electrically connected, and each of a current flowing through the first inductor and a current flowing through the second inductor flows through the common junction point to the output capacitor.

2. The power-supply device according to claim 1, wherein a coupling coefficient of the coupling inductor of the first inductor and the second inductor is more than or equal to 0.9.

3. The power-supply device according to claim 1, wherein the first buck converter is operated during the positive half-cycle period of an AC input voltage, and the second buck converter is operated during the negative half-cycle period of the AC input voltage.

4. The power-supply device according to claim 3, wherein a PWM pulse controls a switching operation of the first power semiconductor switching element of the first buck converter during the positive half-cycle period of the AC input voltage, and controls the switching operation of the second power semiconductor switching element of the second buck converter during the negative half-cycle period of the AC input voltage are controlled.

5. The power-supply device according to claim 3, wherein the PWM pulse controls, at any time, the switching operation of the first power semiconductor switching element and the second power semiconductor switching element, regardless of the positive or the negative half-cycle period of the AC input voltage.

6. The power-supply device according to claim 3, wherein while a value of the AC input voltage is more than or equal to a value of the DC output voltage, the PWM pulse controls an operation of the second power semiconductor switching element of the first buck converter, and controls an operation of the first power semiconductor switching element of the second buck converter.

7. The power-supply device according to claim 1, wherein the second power semiconductor switching element and the first power semiconductor switching element are connected in series.

8. The power-supply device according to claim 1, wherein a power semiconductor switching element having a reverse blocking function is used for the first and the second power semiconductor switching element, and the first and the second power semiconductor switching element are connected in parallel.

9. The power-supply device according to claim 1, further comprising:
a current transformer disposed between the coupling inductor and the output capacitor, or a sense resistance in a current path of a low electric voltage side of the output capacitor.

10. The power-supply device according to claim 4, further comprising:
a third power semiconductor switching element; and
a fourth power semiconductor switching element;
wherein the third power semiconductor switching element is connected in parallel to the first diode, the fourth power semiconductor switching element is connected in parallel to the second diode; and
wherein the fourth power semiconductor switching element is controlled by a reversed pulse of the PWM pulse during the positive half-cycle period of the AC input voltage; and
wherein the third power semiconductor switching element, is controlled by a reversed pulse of the PWM pulse during the negative half-cycle period of the AC input voltage.

11. The power-supply device according to claim 10,
wherein switching operations of the first power semiconductor switching element and the second power semiconductor switching element are controlled by the PWM pulse at any time, regardless of the positive or the negative half-cycle period of the AC input voltage;
wherein the fourth power semiconductor switching element is controlled by a reversed pulse of the PWM pulse during the positive half-cycle period of the AC input voltage; and
wherein the third power semiconductor switching element, is controlled by the reversed pulse of the PWM pulse during the negative half-cycle period of the AC input voltage.

12. The power-supply device according to claim 1,
wherein first and second buck converters are arranged in parallel;
wherein each of the first and second buck converters is controlled by PWM pulses; and
wherein phases of the PWM pulses that control one of the first and second buck converters are shifted 180 degrees to phases of the PWM pulses that control the other of the first and second buck converters, for an interleaved operation of the first and second buck converters.

13. The power-supply device according to claim 12,
wherein the first and second buck converters share the output capacitor.

14. A power-supply device comprising:
an AC-DC converter including a first buck converter and a second buck converter, the first and second buck converters sharing an output capacitor and two circuits, each circuit including one of two inductors;
wherein the first buck converter includes:
a first inductor of the two inductors,
a first power semiconductor switching element configured to intermittently switch on and off a current flowing into the first inductor,
a first diode configured to circulate a current which flows out of the first inductor, when the first power semiconductor switching element is kept off,
the output capacitor,
a third power semiconductor switching element configured to switch on and off between the first inductor and the output capacitor,
a second diode configured to limit a reflex path of a current, when the first power semiconductor switching element is kept on, and
a second body diode connected in parallel with a second power semiconductor switching element;
wherein the second buck converter includes:
a second inductor of the two inductors,
the second power semiconductor switching element configured to intermittently switch on and off a current flowing into the second inductor,
the second diode configured to circulate a current which flows out of the second inductor, when the second power semiconductor switching element is kept off,
the output capacitor,
a fourth power semiconductor switching element configured to switch on and off between the second inductor and the output capacitor,
the first diode configured to limit a reflex path of a current, when the second power semiconductor switching element is kept on, and
a first body diode connected in parallel with the first power semiconductor switching element; and
wherein the fourth power semiconductor switching element is kept off during the positive half-cycle period of the AC input voltage, and the third power semiconductor switching element is kept off during the negative half-cycle period of the AC input voltage.

15. The power-supply device according to claim 14,
wherein the first buck converter is operated during the positive half-cycle period of an AC input voltage;
wherein the second buck converter is operated during the negative half-cycle period of the AC input voltage;
wherein by a PWM pulse controls switching operations of the first power semiconductor switching element and the second power semiconductor switching element;
wherein an operation of the third power semiconductor switching element is controlled by a PWM pulse during the positive half-cycle period of the AC input voltage, and is off-state during the negative half-cycle period of the AC input voltage; and
wherein an operation of the fourth power semiconductor switching element is off-state during the positive half-cycle period of the AC input voltage, and is controlled by the PWM pulse during the negative half-cycle period of the AC input voltage.

16. An LED lighting equipment comprising:
a plurality of LED connected in series; and
a power-supply device supplying constant current to the plurality of LED connected in series;
wherein the power-supply device includes an AC-DC converter including a first buck converter and a second buck converter, the first and second buck converters sharing an output capacitor and a coupling inductor, the coupling inductor including a first inductor and a second inductor that are electromagnetically-coupled with each other;

wherein the first buck converter includes:
the first inductor of the coupling inductor,
a first power semiconductor switching element configured to intermittently switch on and off a current flowing into the first inductor,
a first diode configured to circulate a current which flows out of the first inductor, when the first power semiconductor switching element is kept off,
the output capacitor,
a second diode configured to limit a reflex path of a current, when the first power semiconductor switching element is kept on, and
a second body diode connected in parallel with a second power semiconductor switching element;

wherein the second buck converter includes:
a second inductor of the coupling inductor,
the second power semiconductor switching element configured to intermittently switch on and off a current flowing into the second inductor,
the second diode configured to circulate a current which flows out of the second inductor, when the second power semiconductor switching element is kept off,
the output capacitor,
the first diode configured to limit a reflex path of a current, when the second power semiconductor switching element is kept on, and
a first body diode connected in parallel with the first power semiconductor switching element;

wherein one end of the first inductor and one end of the second inductor are electrically connected with each other through a common junction point with which one end of the output capacitor electrically connected, and each of a current flowing through the first inductor and a current flowing through the second inductor flows through the common junction point to the output capacitor.

17. The power-supply device of claim 14,
wherein the first inductor is connected in series with the third power semiconductor switching element, and the second inductor is connected in series with the fourth power semiconductor switching element.

* * * * *